United States Patent
Perryman

(10) Patent No.: US 12,478,482 B2
(45) Date of Patent: Nov. 25, 2025

(54) INTERBODY ATTACHMENT

(71) Applicant: Choice Spine, LLC, Knoxville, TN (US)

(72) Inventor: John Abraham Perryman, Columbia, TN (US)

(73) Assignee: Choice Spine, LLC, Knoxville, TN (US)

( * ) Notice: Subject to any disclaimer, the term of this patent is extended or adjusted under 35 U.S.C. 154(b) by 122 days.

(21) Appl. No.: 18/512,353

(22) Filed: Nov. 17, 2023

(65) Prior Publication Data

US 2024/0164912 A1  May 23, 2024

Related U.S. Application Data

(60) Provisional application No. 63/426,410, filed on Nov. 18, 2022.

(51) Int. Cl.
*A61F 2/44* (2006.01)

(52) U.S. Cl.
CPC .................. *A61F 2/4455* (2013.01)

(58) Field of Classification Search
CPC .... A61F 2/442; A61F 2/4455; A61B 17/8033; A61B 17/8042; A61B 17/8047; A61B 17/8052
USPC ...................... 623/17.11–17.16; 606/288–290
See application file for complete search history.

(56) References Cited

U.S. PATENT DOCUMENTS

| | | | |
|---|---|---|---|
| 10,543,101 B1* | 1/2020 | Suh | A61F 2/4455 |
| 11,529,241 B2* | 12/2022 | Gamache | A61F 2/4611 |
| 11,617,654 B2* | 4/2023 | Donner | A61B 17/7056 623/17.16 |
| 2009/0105831 A1* | 4/2009 | Jones | A61B 17/7059 606/301 |
| 2015/0025635 A1* | 1/2015 | Laubert | A61F 2/447 29/428 |
| 2021/0251668 A1* | 8/2021 | Thompson | A61B 17/8052 |

* cited by examiner

*Primary Examiner* — Julianna N Harvey
*Assistant Examiner* — Christina Negrellirodriguez
(74) *Attorney, Agent, or Firm* — Luedeka Neely, P.C.

(57) ABSTRACT

An interbody attachment assembly includes an implant having a superior surface, an inferior surface, and an anterior surface extending between the superior surface and the inferior surface. A first screw opening extends superiorly through the anterior surface and through the superior surface and a second screw opening extends inferiorly through the anterior surface and the inferior surface such that a first screw can be inserted through the first screw opening and secure the implant to a superior bone member and a second screw can be inserted through the second screw opening and secure the implant to an inferior bone member. An attachment is configured to be inserted into one or each of the first and second screw openings.

10 Claims, 3 Drawing Sheets

INTERBODY ATTACHMENT

BACKGROUND OF THE INVENTION

Field of the Invention

The invention relates to an interbody attachment device.

Description of the Related Art

The anatomy of a patient can make it difficult for a clinician to adequately be able to secure an implant, particularly in the spine. Relatively small bones and the location of the spinal cord make such an implantation a delicate procedure.

It would be beneficial to provide an attachment to an interbody device to provide easier access for a clinician to secure the interbody to adjacent bone. The attachment can be used to secure the interbody into place after implantation into the patient.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is an interbody attachment comprising a body having a posterior extending projection, the posterior projection sized and shaped to be inserted snugly into a screw opening of an implant. The projection includes a retainer ring extending around a periphery of the projection, wherein the retainer ring restricts the projection from backing out of the screw opening after insertion of the projection into the screw opening. An attachment screw opening extends away from the body and is sized to extend above a superior surface of the implant and allow for a bone screw to be inserted therethrough for insertion into a bone above implant to secure the implant to the bone.

In an alternative embodiment, the present invention is an interbody attachment assembly including an implant having a superior surface, an inferior surface, and an anterior surface extending between the superior surface and the inferior surface. A first screw opening extends superiorly through the anterior surface and through the superior surface and a second screw opening extends inferiorly through the anterior surface and the inferior surface such that a first screw can be inserted through the first screw opening and secure the implant to a superior bone member and a second screw can be inserted through the second screw opening and secure the implant to an inferior bone member. An attachment is configured to be inserted into one or each of the first and second screw openings.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION

Figure 1:
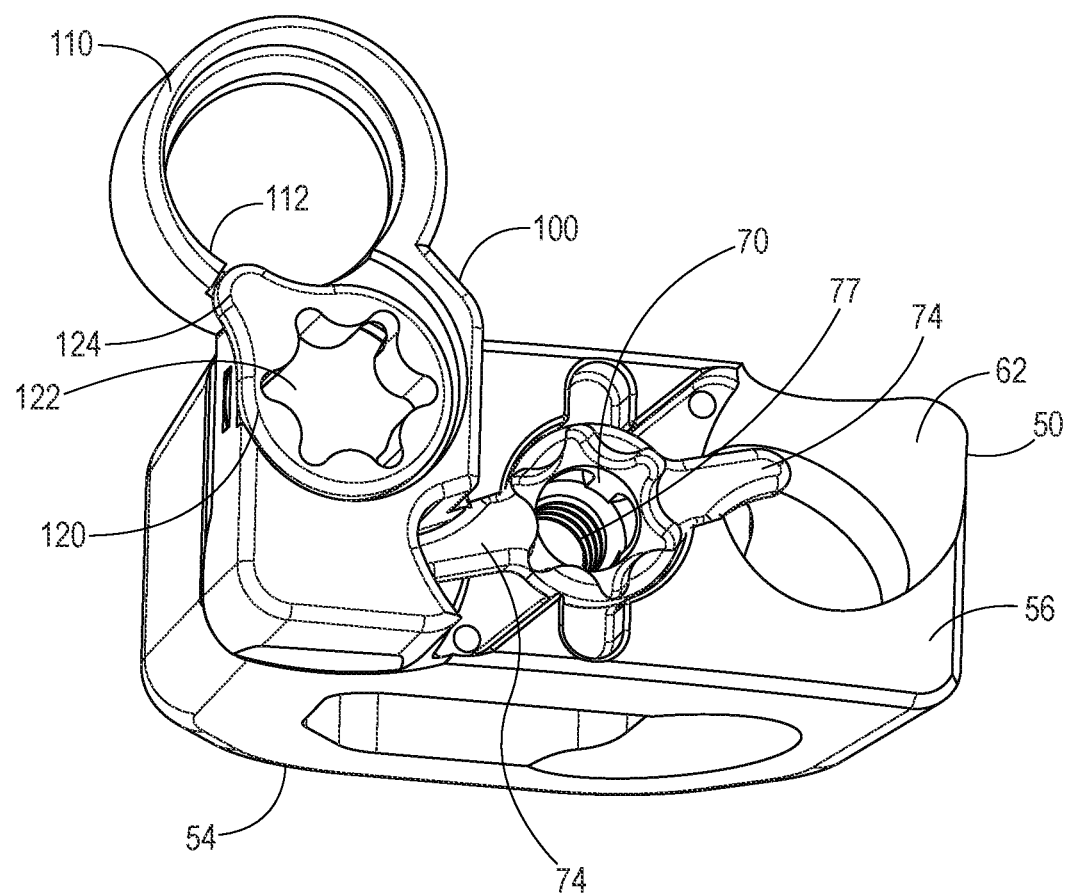
FIG. 1 is a front perspective view of an interbody attachment attached to an interbody according to an exemplary embodiment of the present invention.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Figure 2:
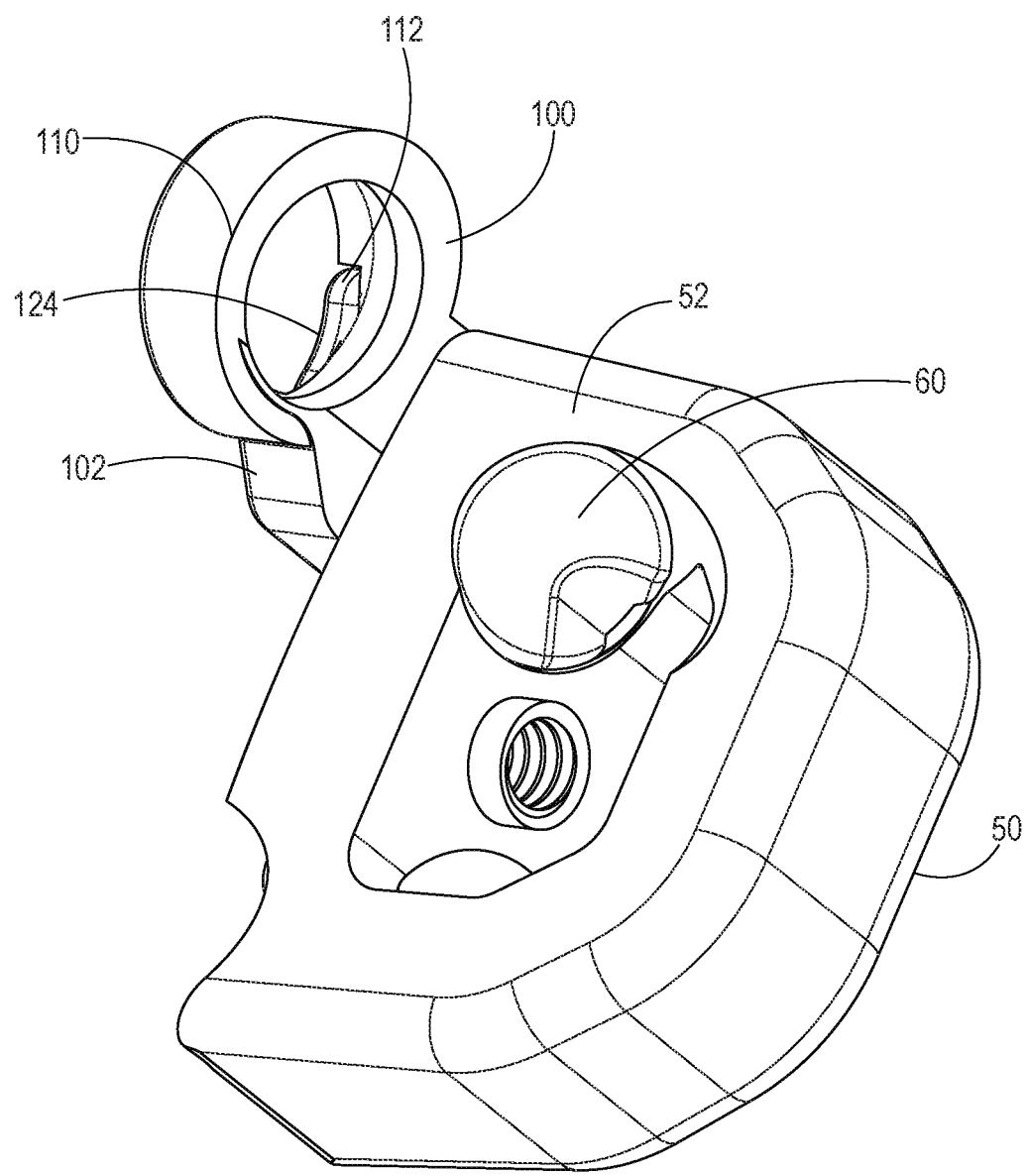
FIG. 2 is a top perspective view of the interbody attachment attached to the interbody of FIG. 1.
Figure 3:
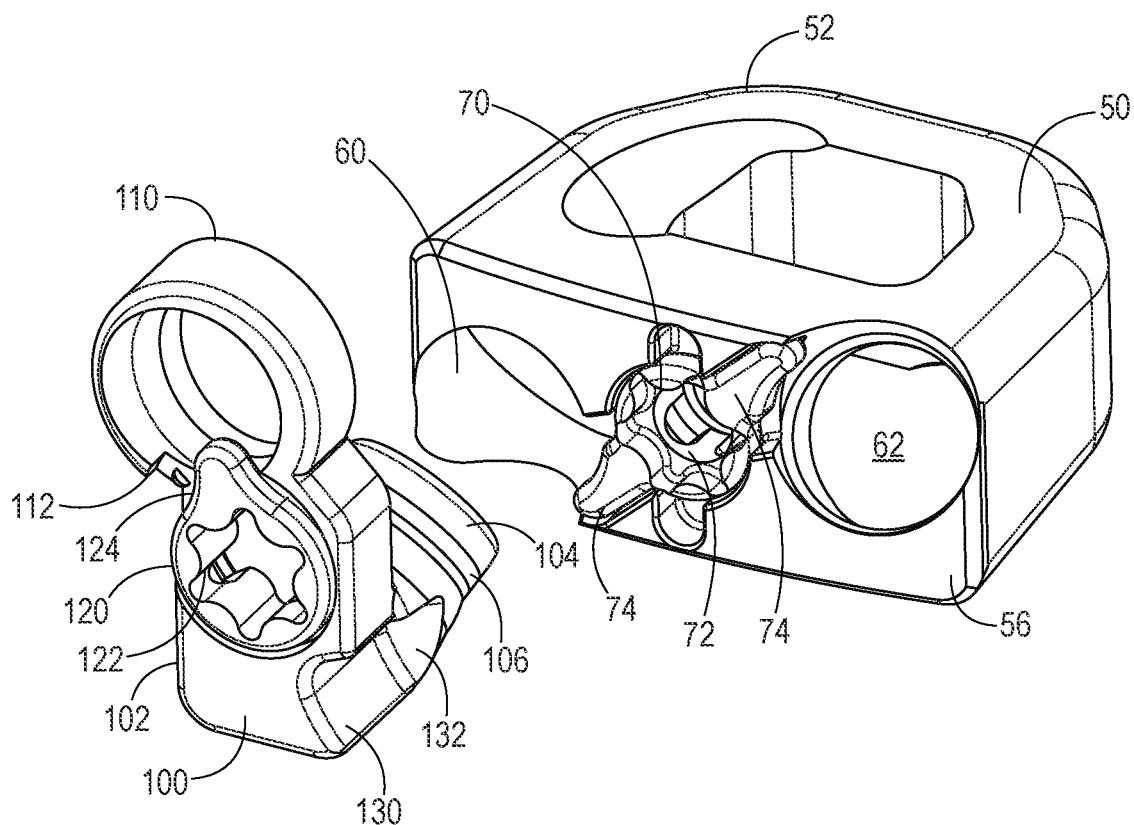
FIG. 3 is an exploded view of the interbody and attachment of FIG. 1.

Referring to FIGS. 1-3, an implant, such as an interbody 50 and an attachment 100 according to an exemplary embodiment of the present invention is used to attach to an interbody device to provide easier access for a clinician to secure the interbody to adjacent bone. The interbody can be a cervical implant, a lumbar implant, or any other implant that can benefit from easier access to screw the interbody into place after implantation into a patient.

Referring to FIGS. 1-3, interbody 50 includes a superior surface 52, an inferior surface 54, and an anterior surface 56 extending between superior surface 52 and inferior surface 54. A first screw opening 60 extends superiorly through anterior surface 56 and through superior surface 52. A second screw opening 62 extends inferiorly through anterior surface 56 and inferior surface 54. A first screw (not shown) can be inserted through first screw opening 62 and secure interbody 50 to a superior bone member (not shown) and a second screw (not shown) can be inserted through second screw opening 64 and secure interbody 50 to an inferior bone member (not shown).

Optionally, a rotating screw lock 70 can be located on anterior surface 56. Screw lock 70 includes a central portion 72 that is configured to accept a driver, such as a hexalobe driver (not shown) to rotate between a locking position and an unlocking position. Screw lock 70 also includes a pair of diametrically opposite arms 74 extending outwardly from central portion 72. Arms 74 are sufficiently long to rotate to the locking position to cover each of the first and second screws after the first and second screws are inserted into first and second screw openings 60, 62, respectively, to prevent the screws from backing out of implant 50. While screw lock 70 is optional, screw lock 70 is beneficial to prevent the screws from backing out after insertion.

Attachment 100 is configured to be inserted into one or each of first and second screw openings 62, 64 to provide the clinician with easier access to secure implant 50 into the patient in the event that patient anatomy interferes with securing implant 50 without attachment 100.

Attachment 100 includes a body 102 having a posterior extending projection 104. Projection 104 is sized and shaped to be inserted snugly into either of screw opening 60, 62. While projection 104 is shown in FIG. 1 as being inserted into first screw opening 60, those skilled in the art will recognize that attachment 100 can be rotated 180 degrees and projection 104 can be inserted into second screw opening 62.

Projection 104 includes a retainer ring 106 that extends around a periphery of projection 104. Retainer ring acts like a barb or singular ratchet tooth to restrict projection from backing out of first screw opening 60 after insertion of projection 104 into first screw opening 62. While a barb-type or ratchet tooth locking mechanism is shown, those skilled in the art will recognize that other retaining mechanisms, such as a plurality of ratchet teeth or other mechanism that can compress while being inserted into first screw opening 60 and then expand to restrict projection 104 from being able to be backed out.

An attachment screw opening 110 extends away from body 102 and is sized to extend above superior surface 52 of interbody 50 and allow for a bone screw (not shown) to be inserted therethrough for insertion into the bone (not shown) above interbody 50 to secure interbody 50 to the bone.

Optionally, a rotating screw lock 120 can be located on anterior surface. Screw lock 120 includes a central portion 122 that is configured to accept a driver, such as a Torx® driver (not shown) to rotate between a locking position and an unlocking position. Screw lock 120 also includes an arm 124 extending outwardly from central portion 122. Arm 124 is sufficiently long to rotate to the locking position to cover the bone screw after the bone screw is inserted through opening 110 to prevent the bone screw from backing out of attachment 100. While screw lock 120 is optional, screw lock 120 is beneficial to prevent the bone screw from backing out after insertion.

When screw lock 120 is present, a portion 112 of body 102 defining attachment screw opening 110 can be cut away, allowing arm 124 to fully rotate to secure the bone screw into place.

Body 102 also includes a cutout 130 that is sized and shaped to allow an arm 74 of screw lock 70 to rotate into cutout 130 when attachment 100 is attached to interbody 50. Cutout 130 includes a posterior surface 132 such that, when projection 104 is inserted into first screw opening 60 and screw lock 70 is rotated to the locking position, posterior surface 132 is locked between arm 74 and anterior surface 56 of interbody 50, further securing attachment 100 to interbody 50.

It will be further understood that various changes in the details, materials, and arrangements of the parts which have been described and illustrated in order to explain the nature of this invention may be made by those skilled in the art without departing from the scope of the invention as expressed in the following claims.

I claim:

1. An interbody attachment comprising:
    a body having a posterior extending projection, the posterior projection sized and shaped to be inserted snugly into a screw opening of an implant, the projection including a retainer ring extending around a periphery of the projection, wherein the retainer ring restricts the projection from backing out of the screw opening of the implant after insertion of the projection into the screw opening of the implant;
    an attachment screw opening extending away from the body and sized to extend above a superior surface of the implant and allow for a bone screw to be inserted therethrough for insertion into a bone above the implant to secure the implant to the bone; and
    a rotating screw lock located on an anterior surface of the body and having a central portion configured to accept a driver to rotate between a locking position and an unlocking position, the rotating screw lock including an arm extending outwardly from the central portion, the arm having a length sufficient to rotate to the locking position to cover the bone screw after the bone screw is inserted through the attachment screw opening to prevent the bone screw from backing out of the body.

2. The interbody attachment according to claim 1, wherein the body further comprises a cutout distal from the attachment screw opening.

3. An interbody attachment assembly comprising:
    an implant having: (1) a superior surface, an inferior surface, and an anterior surface extending between the superior surface and the inferior surface, (2) a first screw opening extending superiorly through the anterior surface and through the superior surface, and (3) a second screw opening extending inferiorly through the anterior surface and the inferior surface such that a first screw can be inserted through the first screw opening and secure the implant to a superior bone member and a second screw can be inserted through the second screw opening and secure the implant to an inferior bone member;

a rotating screw lock located on the anterior surface having a central portion configured to accept a driver to rotate between a locking position and an unlocking position, with a pair of diametrically opposite arms extending outwardly from the central portion and having a length sufficient to rotate to the locking position to cover each of the first and second screws after the first and second screws are inserted into the first and second screw openings, respectively, to prevent the screws from backing out of the implant; and an attachment configured to be inserted into one or each of the first and second screw openings, wherein the attachment comprises a body having a posterior extending projection sized and shaped to be inserted snugly into either of the first or the second screw opening, and wherein the posterior extending projection includes a retainer ring extending around a periphery of the posterior extending projection.

4. The interbody attachment assembly according to claim 3, wherein the retainer ring restricts the posterior extending projection from backing out of the one of the first or the second screw opening after insertion of the posterior extending projection into the one of the first or the second screw opening.

5. The interbody attachment assembly according to claim 3, wherein the attachment further includes an attachment screw opening extending away from the body.

6. The interbody attachment assembly according to claim 5, wherein the attachment screw opening is sized to extend above the superior surface of the implant and allow for a bone screw to be inserted therethrough for insertion into the superior bone member above the implant to secure the implant to the superior bone member.

7. The interbody attachment assembly according to claim 3, wherein the attachment includes a rotating screw lock located on an anterior surface of the attachment.

8. The interbody attachment assembly according to claim 7, wherein the screw lock includes a central portion configured to accept a driver to rotate between a locking position and an unlocking position.

9. The interbody attachment assembly according to claim 8, wherein the screw lock on the attachment includes an arm extending outwardly from the central portion, wherein the arm is sufficiently long to rotate to the locking position to cover a bone screw after the bone screw is inserted through the attachment screw opening to prevent the bone screw from backing out of the attachment screw opening.

10. An interbody attachment assembly comprising:

an implant having: (1) a superior surface, an inferior surface, and an anterior surface extending between the superior surface and the inferior surface, (2) a first screw opening extending superiorly through the anterior surface and through the superior surface, and (3) a second screw opening extending inferiorly through the anterior surface and the inferior surface such that a first screw can be inserted through the first screw opening and secure the implant to a superior bone member and a second screw can be inserted through the second screw opening and secure the implant to an inferior bone member; and an attachment configured to be inserted into one or each of the first and second screw openings, the attachment comprising an attachment body having a posterior extending projection sized and shaped to be inserted snugly into either of the first or the second screw opening, an attachment screw opening extending away from the attachment body, and a rotating screw lock located on an anterior surface of the attachment body and having a central portion configured to accept a driver to rotate between a locking position and an unlocking position, with an arm extending outwardly from the central portion, the arm having a length sufficient to rotate to the locking position to cover a bone screw after the bone screw is inserted through the attachment screw opening to prevent the bone screw from backing out of the attachment screw opening.

* * * * *